MULTIPHASE VIBRATING SWITCHING DEVICE
Filed April 6, 1967
Fig. 1
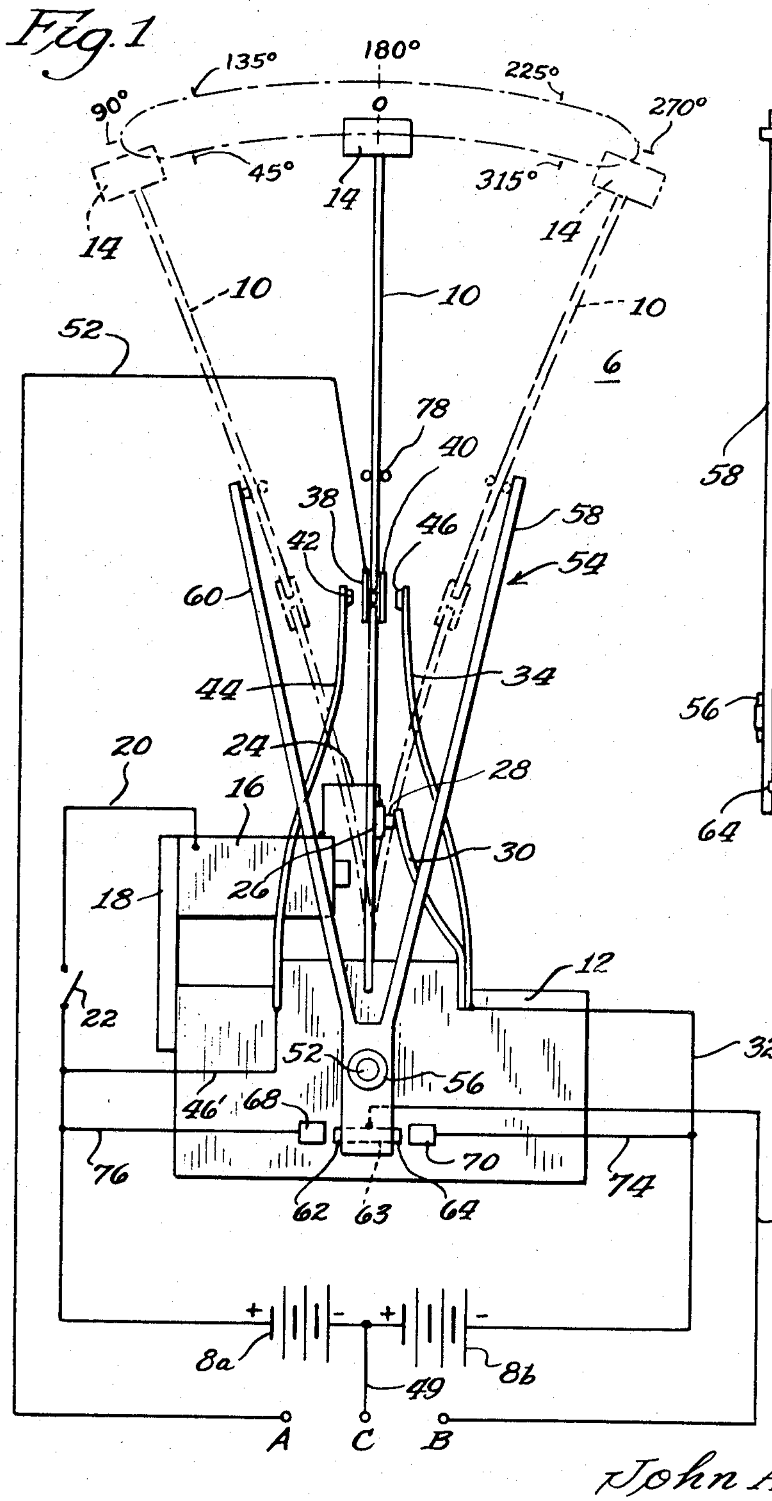
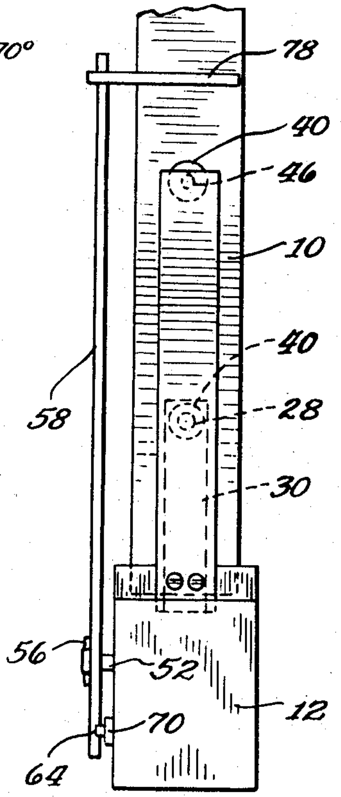
Fig. 2
Inventor
John A. Rankin
By Brown, Jackson, Boettcher & Dienner
Attys.

United States Patent Office 3,439,300
Patented Apr. 15, 1969

3,439,300
MULTIPHASE VIBRATING SWITCHING DEVICE

John A. Rankin, St. Joseph, Mich., assignor to V–M Corporation, Benton Harbor, Mich., a corporation of Michigan Filed Apr. 6, 1967, Ser. No. 628,886
Int. Cl. H01h 51/34
U.S. Cl. 335—88 15 Claims

ABSTRACT OF THE DISCLOSURE

A switching device which uses a vibrating member to control a first and a second mechanical switching arrangement to convert the voltage of a direct current voltage source to multiphase alternating voltages of a highly stable frequency.

The present invention relates to a switch device for the generation of multiphase alternating current voltages from a direct current voltage source, such as a battery.

The alternating current voltages generated may be of two or more phases with the respective phases spaced in time relationship in an orderly fashion dependent upon the number of phases generated. For example, a two-phase generator would be most advantageous if the phases were spaced in time by 90 degrees, or by one-quarter of the period of the resulting alternating current frequency, whereas in a three or five-phase generator the phases would be spaced in time by 60 degrees or by 36 degrees, respectively.

Conventionally, motor-generator sets are used to achieve multi-phase conversion of direct current to alternating current. For the conversion of larger amounts of power these are highly efficient and practical. However, for the conversion of small amounts of power, such as would be required in portable electric equipment, motor-generators are impractical due to their large size, high cost, low efficiency, and poor frequency stability. These disadvantages may be overcome by the use of a vibrator switching device.

Vibrating switching devices having constant frequency of output available in multiple phases have a variety of uses. Probably the most common of these uses is to supply alternating current power to two-phase motors. This is particularly advantageous in many applications where constant motor speed is a desirable characteristic, since the motor speed in certain types of motor structures, such as in a hysteresis synchronous motor, is completely dependent upon the frequency of the supplied power and is relatively independent of the voltage of the power supply. This characteristic is particularly advantageous in battery powered portable tape recorders and phonographs, where efficiency of operation is of extreme importance. That is, in a portable tape recorder which uses a battery as the primary source of power, the use of a vibrating switching device to convert the battery direct current power to alternating current power for a hysteresis synchronous motor will result in a substantial improvement in efficiency over that obtained with a DC source which powers a direct current motor. In addition, the hysteresis synchronism motor, whose speed is determined by the resonance of a highly stable vibrating reed, will provide speed regulation which is much improved over that obtained with direct current motors which rely upon mechanical governors for speed control purposes.

The use of a vibrating switching device in combination with a hysteresis synchronous motor also results in the elimination of mechanical and electrical brush noise, and a definite improvement in motor life by reason of the brush elimination.

The use of vibrator switches for the conversion of direct current to alternating current is well known in the art. One of the better known examples is the vibrator unit used in car radios to convert automobile battery direct current to alternating current for the receiver components. However, most of the vibrating switching devices known to the art have been designed to provide single-phase alternating voltages from direct current voltage sources. For example, see the patents to Cassagnes U.S. Patent No. 375,339, and Rainey, 1,292,048. Other known designs provide two-phase alternating voltages to output windings from direct current sources by means of two vibrating elements, driven in parallel, connected to the output windings through phase shifting circuit elements. For example, see the patent to Sampletro, U.S. Patent No. 2,845,587. Other designs provide two-phase alternating voltages to output windings from direct current sources by means of one vibrating element and phase shifting circuit elements. For example, see the patent to Crafts et al., 2,864,983.

However, it is known that difficulty is experienced in holding phase relationships in phase shifting networks employing capacitors and resistors, and tolerances must be closely held to patrol both the amplitude and phase. In addition, a further improvement in efficiency of operation would be of value in a number of applications, and particularly those applications in which constant motor speed is sought.

In light of the shortcomings of these prior designs, it is an object of this invention to provide an improved vibrating switching device, and particularly an improved device which is characterized by a single vibratory reed in combination with mechancal switching means which effect periodic reversal of voltage from a direct current source conjointly with vibration of the vibratory reed to provide multi-phase alternating current output.

It is another object of this invention to provide an improved switching device characterized by a single vibratory reed in combination with a first and a second mechanical switching means for effecting periodic reversal of voltage from a direct current source in different phases as controlled by vibration of the single vibratory reed.

It is another object of this invention to provide an improved switching device having such first and second mechanical alternating means controlled by vibrating means to provide two-phase alternating current.

Other objects, advantages and features of this invention are set forth and implied in the description of the embodiments of this invention and in the claims which follow. Reference shall hereinafter be had to the annexed drawings.

FIGURE 1 is a front elevation view of a preferred embodiment of a vibrating switching device constructed in accordance with this invention including a schematic illustration of the associated circuitry;

FIGURE 2 is a side elevation view of the preferred embodiment of FIGURE 1, taken from the right side of FIGURE 1, circuitry not shown;

Figures 4, 5, 6:
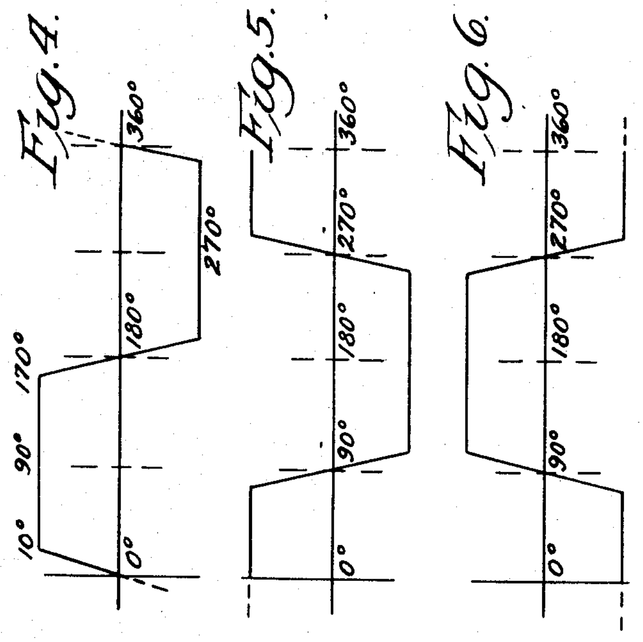
Figures 3A, 3B, 3C:
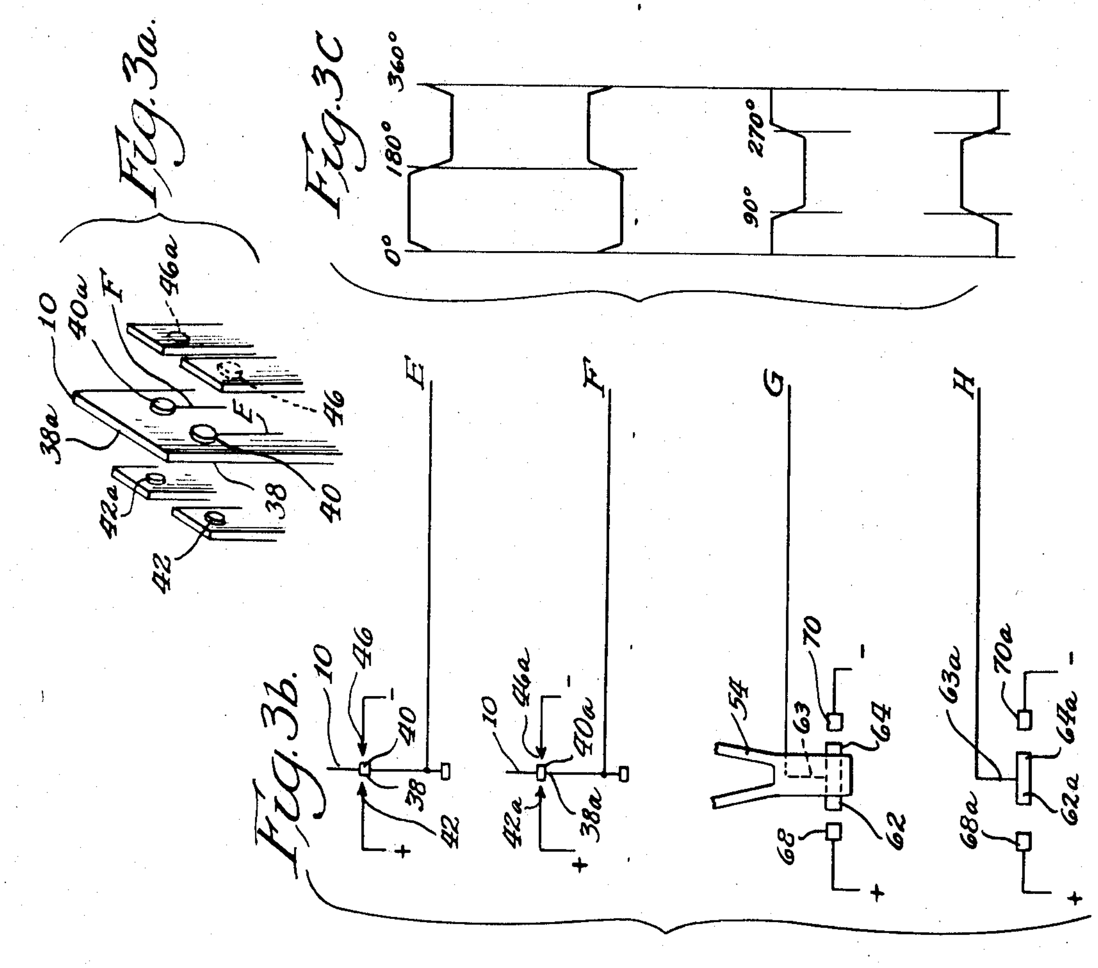

FIGURES 3*a*, 3*b* are schematic illustrations of a further embodiment of a vibrating switching device constructed in accordance with this invention to operate from a single battery source;

FIGURE 3*c* illustrates representative waveforms provided by such structure; and FIGURES 4, 5 and 6 illustrate the waveform and phase output of the switching device of FIGS. 1 and 2.

*General description, vibrating unit*

With reference to FIGS. 1 and 2 a vibrating reed device 6 is illustrated for converting the DC voltage of a source comprised of two DC batteries 8*a*, 8*b* into two output voltages over output terminals A, C; B, C, in which the two output voltages are of the same frequency or repetition rate, and have a discrete and fixed phase relationship. In the embodiment shown in FIG. 1 the two output voltages are in quadrature (or at 90° with respect to one another).

The novel switching device 6 as shown in FIGS. 1, 2 includes a vertically standing reed 10 having its lower end secured within the upper portion of a supporting block of insulating material 12 by any suitable means. Reed 10 is of conventional construction being relatively thin in relation to its width as seen in FIG. 2, and being such that it may be sufficiently resilient as to be capable of vibrating between extreme positions suggested by the phantom position of the reed shown in FIG. 1 in response to intermittent operation of solenoid 16. At the same time it also has sufficient rigidity to support a mass or weight 14 on its outer or free end. Drive means for the cantilever reed comprise a solenoid 16 shown supported by a bracket 18 in spaced overlying relation with base 12. One end of the solenoid winding is connected via conductor 20 and switch 22 to the positive terminal of battery 8*a*, and the other end is connected via conductor 24 to a contact 26 which is mounted on the opposite face of reed 10 and in electrically insulated relation to the reed 10. At 28 is a contact supported on the upper end of a blade spring 30 of electrically conductive metal which is connected over conductor 32 to negative terminal of battery 8*b*. It will be understood that member 30 has sufficient resiliency that it is capable of moving with reed 10 when it is swung to the right of the neutral reed position (0°) shown in FIG. 1, but has a set such that contact 28 does not follow reed 10 as it is attracted by the solenoid to the left of the neutral reed position shown in FIG. 1. In the neutral position of reed 10, shown by full lines, contact 26 and contact 28 are in engagement so that the closing of switch 22 completes the described energizing circuit for the solenoid 16 (+, 22, 20, 16, 24, 26, 28, 30, 32 —). Solenoid 16 when energized attracts reed 10 so that the reed moves to the left of the neutral position (0°) shown in FIG. 1. This movement of reed 10, however, interrupts the original energizing circuit which was completed to solenoid 16 over contacts 26 and 28 and solenoid 16 is deenergized. Reed 10, being resilient, thereupon reverses its direction and reestablishes electrical engagement between contacts 26 and 28. In this manner solenoid 20 is intermittently energized so as to effect vibration of reed 10 and travel along a path generally indicated at 36. Five positions of the reed 10 corresponding approximately to the angular phase displacement of a pure sine wave are represented on the path, the wave starting at 0° and continuing through phase angles of 45°, 90°, 135°, 180°, 225°, 270°, 315° and 360° which is equivalent to one complete cycle of the desired alternating current wave to be desired. The vibrating reed may be end loaded by a mass 14 which is adjustable along the reed length, if desired, to vary the reed resonance.

*First switching means*

The thus described vibration of reed 10 is used to operate a first and a second switching arrangement. The first of these switching devices includes the reed 10 and blade spring members 34, 44 which are operative in response to reed movement to generate an alternating current voltage of a first phase. More specifically, reed 10 includes a pair of electrically connected contacts 38 and 40 which are located on opposite faces of the reed 10 and are electrically insulated from reed 10 but electrically connected with each other and via conductor 52 to terminal A. Aligned with contacts 38 and 40 in spaced relation thereto, as when reed 10 is in its neutral position, are a pair of contacts 42 and 46. These are shown supported on the free end of the pair of blade spring members 44 and 34 of electrically conductive material. These blade springs 44 and 34 are supported as cantilevers by securing their lower ends to opposite ends of base 12 by suitable means, such as screws (not shown).

Blade spring 34 is preferably secured in overlying relation with previously mentioned blade spring 30 and is also electrically connected via conductors 32 to the negative side of battery 8*a*. Blade spring 44 serves to electrically connect contact 42 via conductor 46′ to the positive side of battery 8*b*. In the vibration of reed 10, contacts 38 and 40 are caused to successively and alternately engage with contacts 42 and 46 to cyclically provide positive and negative voltage across the terminals A and C in alternate successive time periods.

The waveform output as provided by the described switching arrangement is shown in FIG. 4. More specifically, each time reed 10 moves to the left of the 0° position shown in FIG. 1 in response to energization of solenoid 16, contact 38 is carried into engagement with contact 42 (approximately 10°—FIG. 4) so that positive potential is connected across terminals A and C by a circuit which extends from positive terminal on battery 8*a* over lead 46′, blade spring 44, contacts 42, 38 and conductor 52 to terminal A. Member 44 is sufficiently flexibly that it moves with reed 10 as it travels from 0° through 45°, 90°, 135° in the direction of 180°, and does not separate therefrom until reed 10 approaches 170° of its travel. As the reed 10 moves to approximately 170° in this reverse direction, contact 38 separates from contact 42, and positive potential to terminal A is interrupted (FIG. 4) and zero potential appears on terminal A as the reed moves through 180°. As the reed travel continues to approximately 190°, contact 40 engages contact 46 and remains in engagement therewith, in the continued movement of the reed 10 through 225°, 270°, 315° toward 360°. During the period contacts 40 and 46 are in engagement, negative battery is connected to terminal A by a circuit extending from the negative terminal of battery 8*b* over conductor 32, spring blade 34, contacts 46, 40 and conductor 52 to terminal A. As the reed approaches 350°, contacts 40, 46 open and the potential on terminal A drops toward zero (FIG. 4). The positive and negative terminals of batteries 8*a*, 8*b* are thus alternately connected to terminal A, so as to create a pulsating alternating voltage across terminals A and C.

*Second switching means*

Vibration of reed 10 also simultaneously operates a second switching means to produce a pulsating voltage across terminals B and C which as shown in FIG. 5 is 90° out of phase with the pulsating voltage produced across terminals A and C. This second switching means utilizes a yoke 54 shown pivotally supported at 52 at the forward side of base 12 so that it is free to swing through a plane disposed in spaced parallel relation to the plane in which the reed 10 is vibrated by solenoid 16. At 56 is a friction clutch washer which tends to hold yoke 54 stable for each of two predetermined switching positions to which it is moved. Below pivotal connection 52, yoke 54 is provided with an elongated electrically conductive member 63 which is electrically insulated from the yoke 54, and which locates contacts 62 and 64 at the two outer ends thereof. Member 63 is connected via conductor 72 to the output terminal B. Base 12 serves as support for a cooperating pair of contacts 68 and 70 which are located in spaced relation to either side of contacts 62, 64 with reed 10 in the illustrated neutral position, but so as to be engaged by a respective one of contacts 62 and 64 with rotation of the yoke 54 about pivot point 56.

As shown in FIG. 1, yoke 54 comprises a pair of upstanding arms 58 and 60 which are also equidistantly spaced on opposite sides of the neutral position of reed 10. Reed 10 is provided with engaging means in the form of a loop of wire 78, having its ends welded to the opposed faces of the reed and which project forwardly so as to engage a respective one of yoke arms 58 and 60 near the outer extremes of the vibrational path of reed 10. As illustrated, the position of yoke arms 58 and 60 are so selected relative to the vibrational path of reed 10 that with the vibration of reed 10 by solenoid 16, the member 78 engages yoke arm 60 to swing the yoke to a first stable switching position where its contact 64 frictionally laps contact 70. The yoke 54 remains in such position until reed 10 has been moved far enough in the opposite direction or to the right so that its engagement means 78 now engages yoke arm 58 and rocks yoke 54 to its second stable switching position to interrupt the circuit over contacts 64, 70, and to cause contact 62 to frictionally lap contact 68. The inherent resiliency of the yoke 54 in cooperation with friction washer 56 serves to hold the yoke in each of these two stable switching positions until deflected therefrom each time the reed has been moved through 180 degrees of its vibrational path.

A representative waveform provided by the second switching arrangement described above is shown in FIG. 5. More specifically, in the second stable switching position of the yoke 54 (which is the position of yoke 54 when the reed is moving from 0° toward 90°), contacts 62 and 68 (which were closed at 270°) connect positive potential of battery 8*a* to terminal B over a circuit which extends from the positive battery terminal over conductor 76, contacts 68, 62, member 63 and conductor 72 to output terminal B. As noted, positive voltage is provided over such terminal as reed 10 moves from 270° through 0° and approaches 90° at the left end of its vibrational path (FIG. 5). At approximately 80° member 78 engages yoke arm 60 and moves the yoke toward the left whereby contacts 68, 62 open to interrupt the positive voltage on terminal B, and momentarily zero voltage appears at terminal B. At approximately 90° of reed travel, the movement of yoke 54 to its first stable position is completed and contacts 64, 70 close to connect negative potential from battery 8*a* to terminal B over a circuit which extends from battery 8*b* (—) over connector 74, contacts 70, 64, member 63 and conductor 72 to terminal B. The negative voltage from battery 8*b* is connected to terminal B over such circuit as reed 10 moves from 90° through 135°, 180° and 225° toward its 270° position (FIG. 5). At approximately 260° of travel in its cycle, engagement member 78 on reed 10 engages yoke arm 58 and rocks the yoke to its other stable operating position to open contacts 64, 70 and thereby interrupt the negative potential to terminal B. As the yoke 54 moves toward its second stable position, zero potential appears at terminal B (FIG. 5) and at approximately 270° yoke 54 reaches its second stable position, and contacts 62, 68 close to again connect positive potential to terminal B.

Thus, a first and second switching means are operated by a single vibratory reed to provide a multiphase A.C. output from a common D.C. source. In the arrangement shown, the two phases are in quadrature (displaced 90° from one another) and with the illustrated connections, the phase of the voltage provided by the second switching means (FIG. 5) leads the voltage provided by the first switching means (FIG. 4).

According to a feature of the invention, the novel switching device may be simply modified so that the phase of the voltage output of the second switching means may be made to lag the phase of the output of the first switching means by 90° by effecting a simple change in the external connections. That is, by the mere interchange of conductors 74, 76 (i.e., connecting conductor 74 to contact 68 and connecting conductor 76 to contact 70) a waveform is produced as shown in FIG. 6, which lags by 90° the phase of the voltage provided by the first switching means.

*Switching device energized by a single battery source*

In the schematic showing of FIG. 3 (which has been so drawn to minimize repetition of the structure set forth in FIGS. 1, 2), the switching device is constructed to provide a two-phase output from a single battery source. As in the switching device shown in FIG. 1, reed 10 is operated in a cyclic manner to control switching of contact sets 38, 42 and 40, 46 (FIGS. 3*a*, 3*b*) at approximately the 0°, 180° positions; and yoke 54 is controlled by reed 10 at approximately the 90°, 270° positions to control the opening and closing of contact sets 68, 62 and 64, 70 in the manner previously described. Since operation of these contact sets and the yoke 54 by the reed 10 in such manner have been previously disclosed, the details are not repeated hereat.

In the present embodiment reed 10 supports a second set of contacts 38*a*, 40*a* (FIG. 3*a*) for engagement with additional blade springs 42*a*, 46*a*. Contact 38*a* which is electrically insulated from reed 10 is mounted to engage leaf spring 42*a* as the reed 10 moves to the left of the neutral position (0°) and contact 40*a* is mounted to engage leaf spring 46*a* as the reed 10 moves to the right of the neutral position, the switching transition for both sets of contacts 38*a*, 42*a* and 40*a*, 46*a*, being the same as that described for the contacts 38, 42 and 40, 46. Blade springs 42 and 46*a*, as shown in FIG. 3*b*, are connected to positive potential on the single battery source, and blade springs 42*a* and 46 are connected to negative *p* potential. Contacts 38, 40 are connected to conductor E and contacts 38*a*, 40*a* are connected to conductor F.

With movement of reed 10 to the left from 0°, contact 38 engages blade spring contact 42, and contact 38*a* engages blade spring contact 42*a* (FIGS. 3*a*, 3*b*), such engagement being maintained as the reed 10 moves through 45°, 90°, 135° and approximately 180° to provide the positive portion of the waveform shown adjacent conductor E (FIG. 3*c*). During the same period, negative potential is connected via contacts 42*a*, 38*a* to conductor F, as shown in the waveform adjacent conductor F.

As the reed 10 approaches 180°, contacts 38, 42; 38*a*, 42*a* open and the voltage on conductors E, F goes to zero. With continued reed movement, contacts 40, 46 and 40*a*, 46*a* close and are held closed in its movement through 225°, 270°, 315° towards 360°. During such period, negative potential is connected by contacts 40*a*, 46*a* to conductor F as shown by the second half of the waveforms adjacent conductors E, F (FIG. 3*c*).

The second switching means (lower portion of FIG. 3*b*) comprises the yoke and contact arrangement described in FIG. 1, and additionally includes a second contact arrangement 62, 63*a*, 64*a*, 68*a*, 70*a* which is similar to contact set 62, 63, 64, 68, 70 shown in FIG. 1, and which are carried by yoke 54 for operation at like time intervals. While various mounting arrangements may be provided, in one embodiment the second member 63*a* is mounted on the outer face of yoke 54 and contacts 68*a*, 70*a* are mounted on a common stud with contact 68, 70, respectively, suitable insulation means being provided to insulate the contacts from each other and the mounting stud. The switching times with such mounting of the additional contacts 62*a*, 68*a*; 64*a*, 70*a* will be the same as the switching time of contacts 62, 68; 64, 70. Contacts 68, 70*a* are connected to the positive terminal of the single battery source and contacts 68*a*, 70 are connected to the negative terminal.

During movement of the reed from or through its zero position, yoke 54 will be in its second stable position and contacts 62, 68 will be closed (such closure having been effected when the reed passes through 270°, as described earlier) and positive potential is coupled to conductor G. Contacts 68*a*, 62*a* of the added contact arrangement are also closed and negative potential is connected to conductor H. As the reed approaches 90°, yoke 54 is shifted to its first stable position and contacts 62, 68; 62*a*, 68*a* are opened to interrupt the positive potential on conductor G and the negative potential on conductor H. With movement of the reed to 90° contacts 64, 70 and 64*a*, 70*a* close to connect negative potential to conductor G and positive potential to conductor H. Such connection is maintained until the reed approaches 270° when the polarity is reversed on conductors G and H by movement of the yoke to its second stable position in the manner described.

*Conclusion*

The novel switching device set forth hereinabove provides an economical unit of improved efficiency for generating alternating current voltages from a direct current source. The unit is particularly advantageous in portable equipment where motor speed is a desirable characteristic, since the use of the novel switching device to provide power of improved frequency stability to a hysteresis synchronous motor will result in improved speed regulation and higher efficiency. The unit has similar advantages in its use to drive other types of motors including the permanent magnet type of two-phase, alternating current motor. These and other applications of the novel device will be apparent to parties skilled in the art.

It is additionally noted that numerous variations of the switching unit may be provided while yet practicing the disclosed invention. That is, although the disclosed embodiment is directed to a vibratory reed which provides output voltage of a first and second phase, it will be apparent that the addition of further switching sets at selected positions along the reed path of travel may be effected to provide three or more phases as desired.

I claim:

1. A switching device for converting voltage from a direct current source to an alternating voltage comprising output terminal means, vibratory means, means for effecting cyclic oscillation of said vibratory means, a first pair of circuit means one of which connects the direct current source to the output terminal means in reverse polarity to the connection thereof by the other of the circuit means, each said circuit means including switching means sequentially controlled by said oscillation of said vibratory means to effect a periodic reverse polarity connection of the direct current source to the output terminal means and provide an alternating current output of one phase, and at least one additional pair of circuit means connecting the direct current source to said output terminal means one in reverse polarity to the other and each said circuit means including switching means sequentially controlled by said vibratory means in the same oscillation to effect a periodic reverse connection of the direct current source to the output terminal means, said switching means of the additional pair of circuit means being operated through means effecting a time delay such as to provide an alternating current output of a second phase which is displaced from said first phase.

2. A switching device as set forth in claim 1 in which said vibratory means are cyclically oscillated through a predetermined travel pattern, and in which said vibratory means includes a member for operating said switching means of the additional circuit means at predetermined spaced positions along said travel pattern different from the position at which said switching means of the first circuit means are operated.

3. A switching device as set forth in claim 1 in which said vibratory means includes means moved with said vibratory means in said oscillating movement for operating said switching means of the additional circuit means at predetermined positions in each oscillation, which positions are spaced at 90° from the position at which said switching means of the first circuit means are operated to produce an alternating current output having a phase which is in quadrature with said first phase.

4. A switching device for converting voltage from a direct current source to an alternating voltage comprising circuit means for connecting the direct current source across a load, at least two sets of switching means in said circuit means, one switching means of each set when closed connecting the direct current source in reverse polarity across the load to the polarity connection of the direct current source across the load when another switching means of the set is closed, a vibratory member and means for effecting oscillation of said vibratory member, the first set of switching means being positioned to be sequentially closed and then opened by said oscillation of the vibratory member effecting a periodic reverse connection of the direct current source across the load to provide an alternating current output of one phase, a movable member mounted to be shifted first into one position subsequent to the closing of one switching means of the first set and then into a second position subsequent to the closing of the other switching means of the first set, one of the second set of switching means being held closed by the movable means in each of its two positions so as to effect a periodic reversal connection of the direct current source across the load lagging the periodic reversal connection thereof by the first set of switching means and providing an alternating current output of a second phase which is displaced from said first phase.

5. A switching device as set forth in claim 4 in which said second set of switching means are positioned for operation by said movable member at each extreme position of travel of said vibratory member in its oscillation.

6. A switching device as set forth in claim 4 in which said first set of switching means includes a first contact set mounted for operation by said vibratory member to provide a current output of a first polarity for approximately the first 180° of oscillation of said vibratory member, and a second contact set mounted for operation by said vibratory member to provide a current output of a second polarity for approximately the second 180° of oscillation of said vibratory member, and means on said vibratory member for operating said movable member and thereby the second set of switching means at time intervals displaced in time from said operating times for said first and second contact sets.

7. A switching device for converting the voltage of a direct current source to an alternating voltage comprising a vibratory member, means supporting said vibratory member for oscillation, means for vibrating said vibratory member, switch means including a first contact means and a second contact means, a movable member movable between two stable positions, third contact means carried by said movable member to engage said first contact means in one of said stable positions, and to engage said second contact means in said second stable position, and means controlled by an excursion of said vibratory member to adjust said movable member between said two stable positions in each oscillation of said vibratory member.

8. A switching device as set forth in claim 7 in which said movable member is positioned to be shifted between stable positions at each extreme end of the vibratory member excursion.

9. A switch device as set forth in claim 7 which includes a first movable contact means which are closed by and moved with said vibratory member for one portion of each oscillation, and a second movable contact means which are closed by and moved with said vibratory member during a different portion of each oscillation.

10. A switching device as set forth in claim 7 which includes fourth and fifth contact means, and further switch means on said movable member controlled by said vibratory member in each oscillation to engage said fourth and fifth contact means in timed relation with the engagement of said third contact means with said first and second contact means.

11. A switching device for converting the voltage of a direct current source to an alternating voltage comprising a vibratory member, means supporting said vibratory member for oscillation, means for vibrating said vibratory member, switch means including a first contact means and a second contact means, circuit means for connecting each of said contact means to a different polarity of said direct current voltage source, a movable switch member movable between two stable positions, further contact means carried by said movable switch member to engage said first contact means in one of said stable positions, and to engage said second contact means in said second stable position, means controlled by said vibratory member to adjust said movable member between said two stable positions in each oscillation of said vibratory member, and a first output circuit connected to said further contact means and to said direct current source to provide an alternating voltage output in response to said first and second contact means being sequentially engaged by said further contact means.

12. A switching device as set forth in claim 11 which includes a second output circuit, and further switch means controlled by said vibratory member in each oscillation to provide a further alternating current output over said second output circuit of a different phase than provided over said first output circuit.

13. A switching device as set forth in claim 11 wherein said movable switch member comprises a forked yoke member mounted for pivotal movement, and in which said vibratory member carries an operating member for engaging one of said forks at one point in its travel to operate said movable member to one of said stable positions, and for engaging the other of said forks at a different position in its travel to operate said movable member to the other one of said stable positions.

14. A switching device for converting voltage from a direct current source to an alternating voltage, comprising a single vibratory member, means for effecting cyclic oscillation of said vibratory member, switching means for providing an alternating current output including a first movable contact means and a second movable contact means concurrently operated to a make position with first associated contact means by said vibratory means for a first period of said oscillation, and a third movable contact means, and a fourth movable contact means concurrently operated by said single vibratory member into a make position with different associated contacts for a different period of said oscillation, circuit means for connecting said associated contacts to one side of the output, means for connecting potential of one polarity to said first and second contact means, and means for connecting potential of the opposite polarity to said third and fourth contact means, said potential being connectable to the other side of the output.

15. A switching device as set forth in claim 14 in which said associated contacts and said further associated contacts are carried on said single vibratory member.

References Cited

UNITED STATES PATENTS

| | | | |
|---|---|---|---|
| 2,167,084 | 7/1939 | Nulsen | 335—89 |
| 2,455,253 | 11/1948 | Huetten | 335—89 |
| 2,490,895 | 12/1949 | Aust | 335—88 |
| 2,541,427 | 2/1951 | Lee | 335—97 |

BERNARD A. GILHEANY, *Primary Examiner.*

HAROLD BROOME, *Assistant Examiner.*